United States Patent
Memoli et al.

(10) Patent No.: US 7,611,563 B2
(45) Date of Patent: Nov. 3, 2009

(54) MULTIFUNCTION INJECTOR AND RELATIVE COMBUSTION PROCESS FOR METALLURGICAL TREATMENT IN AN ELECTRIC ARC FURNACE

(75) Inventors: Francesco Memoli, Milan (IT); Mauro Bianchi Ferri, Milan (IT); Marcello Pozzi, Santa Maria Hoe' Lecco (IT); Enrico Malfa, Zanica Bergamo (IT)

(73) Assignee: Techint Compagnia Tenica Internazionale S.p.A., Milan (IT)

( * ) Notice: Subject to any disclaimer, the term of this patent is extended or adjusted under 35 U.S.C. 154(b) by 31 days.

(21) Appl. No.: 11/883,662

(22) PCT Filed: Feb. 13, 2006

(86) PCT No.: PCT/EP2006/001405

§ 371 (c)(1), (2), (4) Date: Aug. 2, 2007

(87) PCT Pub. No.: WO2006/087189

PCT Pub. Date: Aug. 24, 2006

(65) Prior Publication Data

US 2008/0134838 A1 Jun. 12, 2008

(30) Foreign Application Priority Data

Feb. 18, 2005 (IT) .......................... MI2005A0241

(51) Int. Cl.
  *C21C 5/35* (2006.01)
(52) U.S. Cl. .............................. 75/530; 75/553; 266/47; 266/221; 266/225; 266/268
(58) Field of Classification Search ................. 266/221, 266/268, 47, 225; 75/530, 553
See application file for complete search history.

(56) References Cited

U.S. PATENT DOCUMENTS

| | | | |
|---|---|---|---|
| 3,876,190 A | | 4/1975 | Johnstone et al. |
| 4,173,499 A | * | 11/1979 | Holemann .................. 148/194 |
| 4,455,166 A | | 6/1984 | Brancaz et al. |
| 4,752,330 A | * | 6/1988 | Gitman ........................ 75/553 |
| 6,125,133 A | * | 9/2000 | Mathur et al. .................. 373/8 |
| 6,142,764 A | | 11/2000 | Anderson et al. |
| 6,372,010 B1 | * | 4/2002 | Shver et al. .................. 75/10.4 |

(Continued)

FOREIGN PATENT DOCUMENTS

FR 2812659 2/2002

(Continued)

OTHER PUBLICATIONS

International Search Report, May 29, 2006.

*Primary Examiner*—George Wyszomierski
*Assistant Examiner*—Tima M McGuthry-Banks
(74) *Attorney, Agent, or Firm*—James V. Costigan; Hedman & Costigan, P.C.

(57) ABSTRACT

A multifunction injector (10, 11, 12) comprising a De Laval nozzle (20) adapted to act as a burner at subsonic or supersonic speed, combined with a plurality of nozzles (31, 32) for fuel and comburant respectively, arranged in two rings, concentric and co-axial to said De Laval nozzle (20) and externally protected by a specifically shaped protection cavity (40).

9 Claims, 4 Drawing Sheets

U.S. PATENT DOCUMENTS

| | | | |
|---|---|---|---|
| 6,383,445 B1 * | 5/2002 | Anderson et al. | 266/225 |
| 6,514,310 B2 * | 2/2003 | Allemand et al. | 75/414 |
| 6,558,614 B1 | 5/2003 | Fritz | |
| 6,805,724 B2 * | 10/2004 | Shver | 75/10.4 |
| 2006/0038326 A1 * | 2/2006 | Vecchiet et al. | 266/218 |

FOREIGN PATENT DOCUMENTS

| | | |
|---|---|---|
| WO | WO 8902051 | 3/1989 |

* cited by examiner

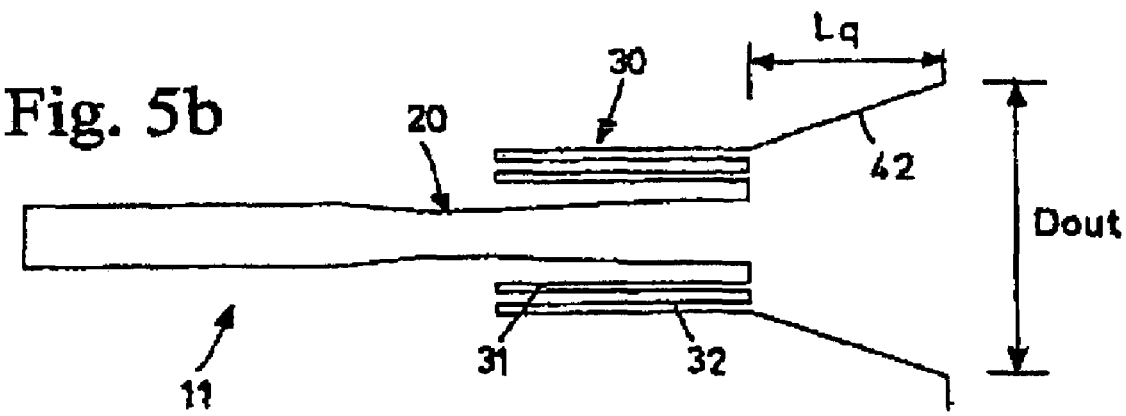
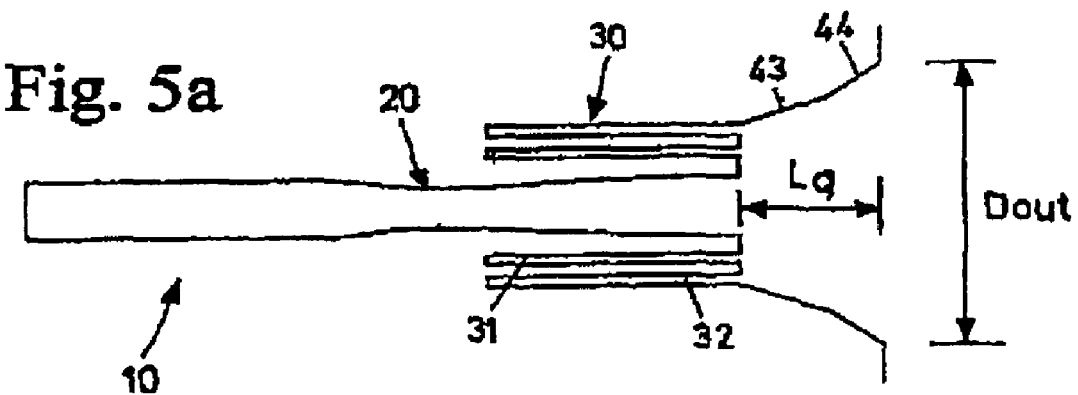

MULTIFUNCTION INJECTOR AND RELATIVE COMBUSTION PROCESS FOR METALLURGICAL TREATMENT IN AN ELECTRIC ARC FURNACE

The present invention relates to a multifunction injector destined for combustion in iron metallurgy treatment in an electric arc furnace.

The invention also relates to a combustion process for iron metallurgy treatment in an electric arc furnace using the multifunction injector.

Electric arc or EAF furnace technology is rapidly expanding in the field of steel production. The commercial interest in this process is due to the ever increasing need for recycling scrap metal and other scrap materials, combined with the excellent results obtained with these techniques for scrap recovery.

The cycle used to obtain iron, steel, and cast iron using electric arc furnaces or EAF is generally performed in batches: the scrap is loaded during an initial step of the process in an interval that lasts about ten minutes, after injection in a residual bath during the previous production step.

Therefore, the time involved in melting the mass of scrap metal in immersion has a strong effect on the total duration of the cycle for obtaining the liquid product. Any method able to accelerate the initial melting step will obviously reduce the total treatment time, creating greater production efficiency in the steel works.

In an EAF furnace, the metal is supplied with energy mainly from the electrodes through electrical conduction, due to Joule effect. The mixing of the metal and the slag, induced by the forming of electrical arcs at the peaks of graphite electrodes, facilitates the heat transfer to all parts of the furnace. In this case, the transfer of the thermal energy to the scrap is a very slow process. The material in the bath is heated through direct conduction, but the low density of the scrap inhibits heat transfer to the overlying parts. The remaining part of the loaded mass is heated by radiation. Furthermore the most external parts of the load create a shield against the internal mass, thus slowing down the melting process.

In order to improve the heating efficiency, and therefore to reduce load melting times, the current process in use relies on burners that supply heat directly to the external part of the load by chemical means. The burners suitable for this use are fuel-oxygen type or Oxy-fuel, wherein the fuel is composed of a gas such as propane, natural gas, or a mixture of both, for example. The comburant is pure oxygen, and the burners work with a relatively wide flame in order to heat wide areas, including the area over the top of the bath.

In large-sized furnaces, these systems cooperate to maintain the bath temperature uniform. Some attempts have been made to produce burners able to modify the flame characteristics, as in US20030054301.

Once all the loaded material has been completely melted, the actual cycle for obtaining the metallurgical product begins. This can be iron, cast iron, or liquid steel. In order to obtain the required chemical reaction during this step, as well as energy, correctly balanced amounts of carbon and/or oxygen must be introduced into the bath.

To perform this, the external layer of the slag must be perforated using high-speed supersonic jets generated through suitable injectors. In order to achieve the kinetic thrust and concentration along the axis of the gases to be injected into the metal, and strong enough to pierce the external slag layer while maintaining sufficient energy to bubble through the metal, certain measures have been adopted (shapes and arrangement of the nozzles), and last but not least, a covering method over the main jet called shrouding.

In this technique (known for example from the Praxair U.S. Pat. No. 5,823,762, the gas injected into the bath at supersonic speed (Mach>2), is surrounded by a gas mixture in combustion phase. For a long distance in the travel direction of the jet, the combustion in the external ring forms a shroud which confines the technical gases to be injected on one hand, and on the other, generates a hot protective layer that, reduces the mass of gas captured by the main jet (entrainment) thus increasing the length of the high speed zone.

The two systems described, burner and injector, result as being very efficient as far as their specific sphere of action is concerned, but their function is limited to limited periods in the productive cycle, while remaining inert in other periods.

Even when optimised, the use of supersonic injectors, as taught by U.S. Pat. No. 6,514,310 for example, and assigned to Airliquid, and in the corresponding European Patent EP1179602, is not effective during the total scrap melting stage, because the jet coherence can cut through or pierce the scrap mass locally, crossing the layer without giving off heat in an efficient manner, which is a problem.

Likewise, during the decarburization step the burners generate a poorly coherent jet that is not able to attain the liquid metal and therefore the heat generated on the slag and in the ring is dispersed. The excessive vicinity of the nozzles to the liquid bath, sometimes adopted to overcome this problem, increases the possibility of inefficient function caused by the deposit of exogenous materials on the nozzles.

Because of the aforesaid problems with prior art devices, in order to attain maximum efficiency, latest generation EAF furnaces must be equipped with arrays of both types of equipment (burners and supersonic injectors).

However, it must also be considered that the furnace environment is particularly taxing: all the equipment placed in the furnace is subject to very high temperatures, dust of various nature deposits on every exposed surface, and the danger of being hit by strong slag splattering increases when close to the bath, solidification can block up the nozzles, the transfer supports that bear the nozzles and connect them to the supply and control lines are complex liquid-cooled panels installed on the furnace walls in appropriate openings set into the refractory fettling.

For this reason, the use of two separate apparatuses results in a considerable cost increase in all aspects, whether this refers to initial investment (greater plant complexity), conduction (greater need for control), inspections, maintenance and similar work, consumption (washing gas to prevent nozzle blocking), as well as the operating risk of greater probabilities of machine arrest.

Attempts to resolve the aforesaid problems encountered in prior art have been made in the past. One of these is reported in patent application US2001/0043639 which proposes a method of operating wall mounted injectors in differentiated mode during the scrap melting step (burners) and decarburisation (nozzles).

However the problem of how to construct this apparatus was not addressed in this patent.

The Applicant posed the problem of reducing the large number of burners and injectors necessary under different furnace working conditions, and thought of creating an apparatus (multifunctional injector) arranged in a manner to be able to modify the flame generated by one configuration with a wide opening similar to that of an oxy-fuel burner to that of a covering or shrouding configuration for the central supersonic jet.

The Applicant also designed a multifunction injector wherein the supply control system is equipped with the possibility of stabilising the flame for each intermediate configuration, between oxy-fuel and shrouding, in order to optimise the thermal contribution in all metallurgical stages of the EAF furnace.

The general aim of the present invention is therefore to supply a multifunction injector arranged so that it is able to modify the flame as it exits in a configuration with a wide opening similar to that of an oxy-fuel burner, changing it to a covering or shrouding configuration for the central supersonic jet.

Another aim of the present invention is to realise a multifunction injector that can be optimised, not only under the extreme conditions of scrap melting and supersonic oxygen injection into the liquid metal, but that is also suitable under intermediate conditions for improving heat transfer according to load needs, including through localised heating, in order to increase heat and/or injection homogeneity in the metal to improve chemical reaction.

A further aim of the present invention is to provide a flexible combustion method for metallurgy treatment in electric arc furnaces using a multifunction injector. The multifunction injector according to the present invention includes a De Laval nozzle regulated for subsonic or supersonic operations combined with a plurality of nozzles for fuel and comburant injection respectively, positioned on two rings concentric and co-axial with said De Laval nozzle and protected externally by means of a suitably shaped cavity. The flexibility of the combustion process is achieved through the generation of an added circumferential and tangential speed component for injecting external comburant and fuel.

This makes it possible to regulate the length and opening of the flame during the burner stage by acting on the distribution between the oxygen from the internal nozzle and the oxygen from the holes located on the external ring, and in any case, to obtain a jet with a very large supersonic zone during the refining step. Under the same geometrical conditions, this flexibility exists both during running operations, and during the project planning stage, by varying the angle of the propeller so that it is adapted to the specific needs of the furnace: furnace width, scrap size, and similar aspects.

The present invention also relates to a combustion process for metallurgical treatment in an electric arc furnace using a multifunction injector which is developed to perform the following steps:
  operating as a burner with a subsonic De Laval nozzle with rapid combustion gas mixing to obtain a wide flame able to heat the scrap agglomerates located in front of it rapidly and efficiently;
  operating as a burner with a supersonic De Laval nozzle with a concentrated flame and high pulse rate to cut the scrap, and therefore to break up the conglomerate formations in front of the multifunction injector;
  operating as an oxygen injector at supersonic speed with a supersonic zone extended as far as 70 times the diameter of the De Laval nozzle opening, using a shrouding method to confine the flare laterally, and under these conditions being able to inject oxygen directly into the liquid metal bath.

With the aforesaid aims in mind, according to the present invention, it was decided to realise a multifunction injector and a relative combustion process for metallurgical treatment in an electric arc furnace, having the characteristics described in the appended claims.

The functional and structural characteristics of the present invention, as well as the advantages to be gained compared to prior technical art will be made clearer and more obvious from the following description in reference to the appended schematic drawings wherein:

FIGS. 5a-5b show respectively schematic side views of the injector according to a preferred embodiment of the invention and another embodiment of injectors according to the invention;

FIG. 6 is a graph illustrating certain examples of injector operation performed by the preferred embodiment illustrated in FIGS. 2 and 5a.

Figure 1:
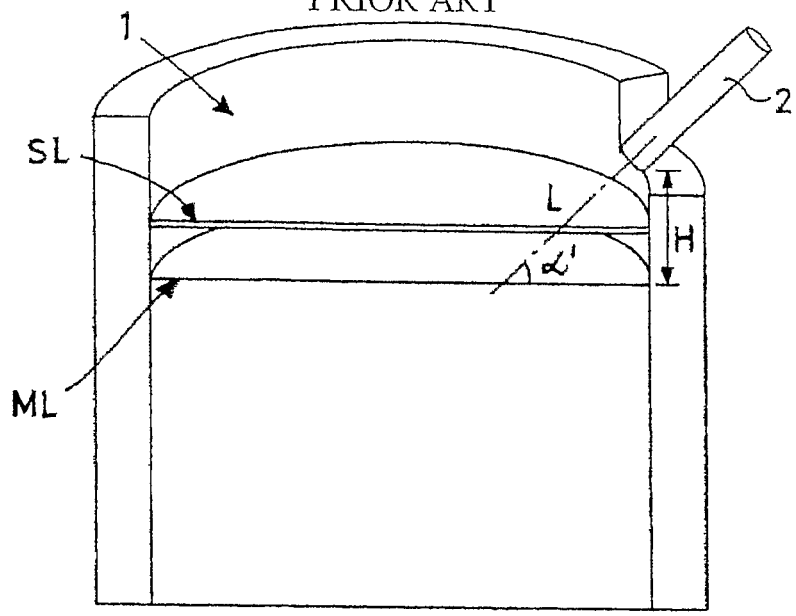
FIG. 1 is a schematic perspective view of an Electric Arc Furnace equipped with a nozzle according to known art.
Figure 2:
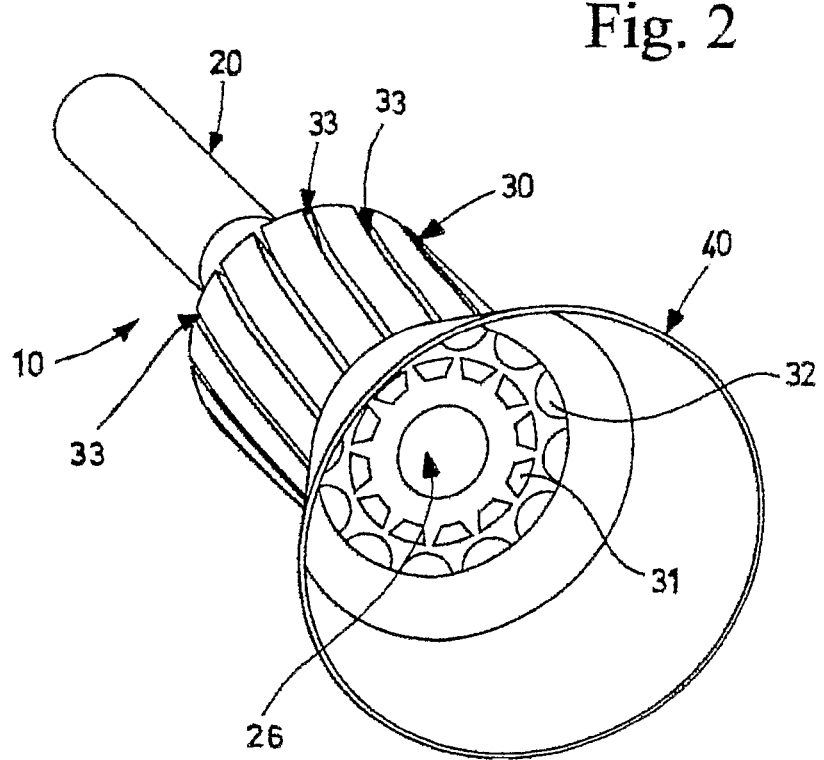
FIG. 2 is a schematic perspective view of an injector according to the present invention.

An electric arc furnace 1 according to prior art is shown in FIG. 1, wherein a conventional nozzle 2 is adapted to emit a flame according to a predefined angle α' at a height H and a distance L from the metal bath ML below the level of the slag SL.

FIGS. 2 to 6 show a multifunction injector 10, according to the present invention comprises a De Laval nozzle 20 adapted to operate as a burner at subsonic or supersonic speed, combined with a ring composed of a plurality of ring injectors, respectively composed of fuel nozzles 31, and comburant nozzles 32, said ring injectors being arranged in a concentric and co-axial manner around said De Laval nozzle 20, wherein the ring of fuel nozzles encircles the central De Laval nozzle, positioned further inside with respect to the ring of comburant nozzles.

The two rings and the nozzle are externally protected by a specifically shaped protection cavity 40.

FIGS. 5a-5b show the injector 10 in its preferred embodiment, as an outlet into a specifically shaped protection cavity 40, presenting a first and a second section 43 and 44 in a conical sequence, preferably 20° and 30°.

FIG. 5b shows an injector 11 equipped with a protection cavity 40 with a constant conical form 42, preferably 20°.

A non-limiting example of protection cavity 40 dimensions 40 is shown as follows:

| Injector 10 | Lq = 45.51 mm | Dout = 103.6 mm |
| Injector 11 | Lq = 60 mm | Dout = 103.6 mm |

Figure 3:
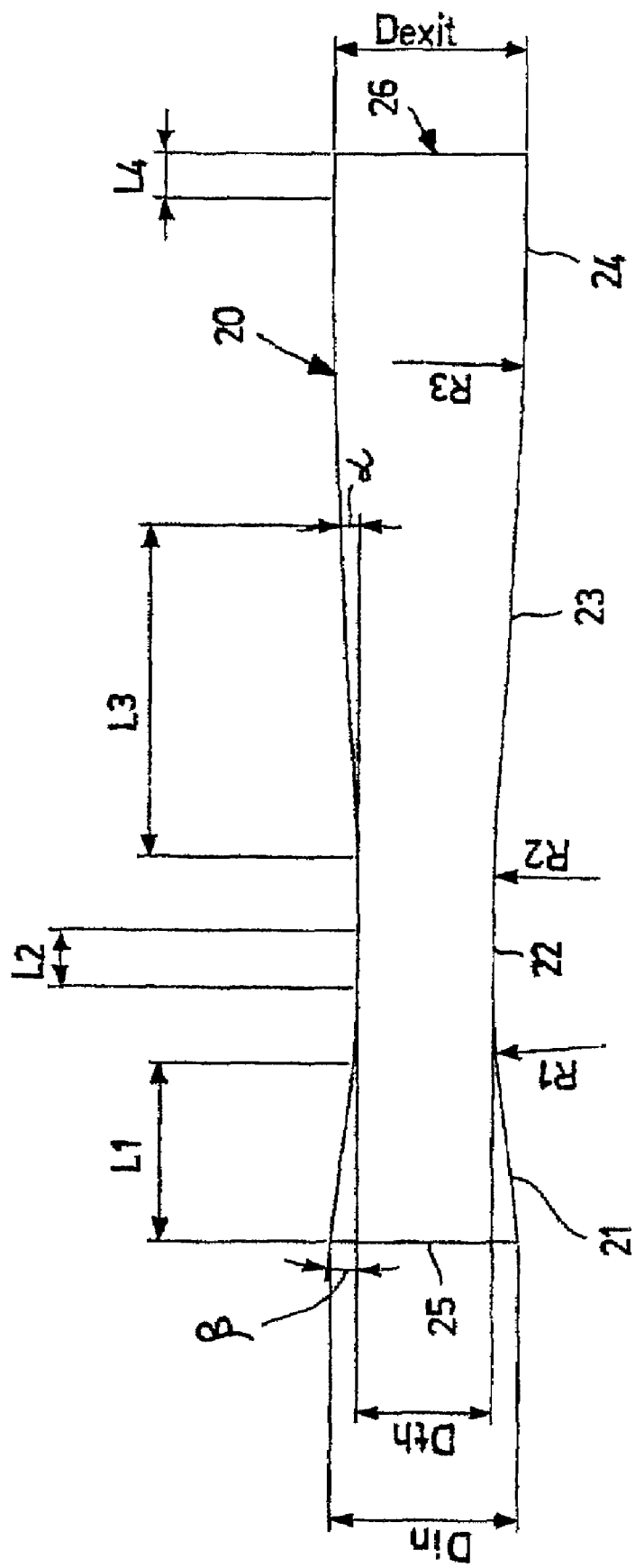
FIG. 3 is a side view of a De Laval nozzle as a component part of the injector according to the invention.
Figure 4:
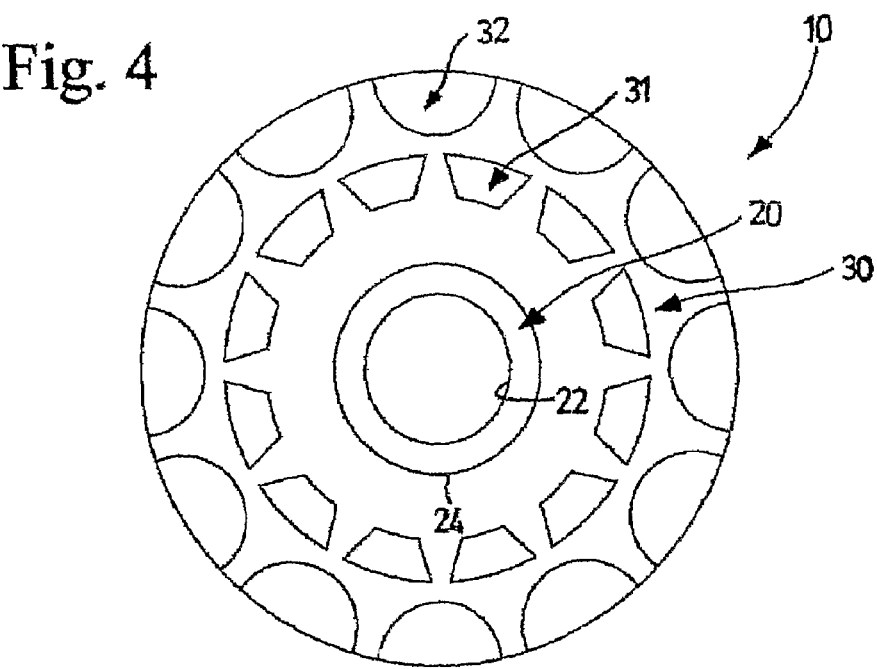
FIG. 4 is a schematic front end view of a detail of the injector shown in FIG. 2.

The central nozzle for the converging-diverging oxygen must guarantee excellent efficiency: in reference to FIG. 3, nozzle 20 comprises the following in sequence, starting from the mouthpiece:

A conical converging inlet section 21, having a length L1, inlet 25 with inlet diameter Din and half-angle of incidence β;

A cylindrical throat 22 having a length L2 and a throat diameter Dth;

A circumferential tapering between the conical inlet section 21 and the following central cylindrical throat 22, having a radius R1;

A conical diverging inlet section 23, having a length L3, and half-angle of incidence α;

A circumferential tapering between the throat 22 and the conical diverging outlet section 23, having a radius R2;

A final cylindrical oxygen emission section 24, having a length L4 and an outlet diameter Dexit.

A circumferential tapering between the conical diverging section 23 and the final cylindrical oxygen emission section 24 having a radius R3.

In general the parameters that identify a nozzle are the inlet, throat and outlet diameters, in turn connected with the inlet speed, the Mach number, the flow, the passing mass and the static pressure of the outgoing gas. All the variables are connected with the conditions they are subject to during the various operating steps.

Considering the conditions required for an EAF furnace, the Applicant was able to calculate that performance is optimised if the following relations are respected:

The half-angle β of the converging conical inlet section 21 is between 7° and 20°;

The half-angle α of the diverging conical outlet section 23 is between 2° and 7°;

The tapering radius R1 between the conical inlet section 21 and the cylindrical throat 22 is between 1 and 10 times the diameter Dth of the throat;

The length L2 of the cylindrical throat 22 is between 0.5 and 5 times the diameter of the throat itself Dth;

The tapering radius R2 between the cylindrical throat 22 and the diverging conical outlet section 23 is between 1 and 15 times the diameter of the throat Dth;

The tapering radius R3, between the diverging conical section 23 and the final cylindrical section 24 is between 20 and 80 times the diameter of the throat Dth;

The length of the final cylindrical section 24 is between 0 and 3 times the diameter of the throat Dth.

In this manner, the oxygen jet is optimised under the most critical conditions, that is, of maximum speed.

As far as the peripheral injection nozzles, respectively 31 and 32, or fuel and comburant nozzles are concerned, to take advantage of the shrouding effect the nozzles are arranged in two concentric rings around the central oxygen nozzle. In particular:

the fuel injection nozzles 31 are of a number between 8 and 20, their shape can be trapezoid, circular, or some other form. These nozzles are positioned in a complete circle around the De Laval oxygen nozzle 20 and inside the circle of the comburant nozzles 32.

The comburant nozzles 32 are arranged on the second ring around the De Laval oxygen nozzle 20 and the first ring of fuel nozzles 31. The number of the comburant nozzles 32 is preferably between 8 and 20, and their individual section may vary—circular, semi-circular, trapezoid, but other shapes may be used just as efficiently.

Injector optimisation is achieved by considering the most extreme working conditions, in other words, with the centre jet at 2 Mach and applying the shrouding effect.

However, since the intermediate working conditions can be negatively affected by this project arrangement, in order to prevent negative effects such as flame instability or sudden extinguishing, a specifically shaped stabilising protection cavity 40 is adopted. Basically, this protection cavity creates a protection tunnel inside which the injector is inserted. In this manner, when the gases exit at low speed their mixing is improved, and they are less affected by external disturbance that causes instability.

In this specific case, this protection cavity 40 also acts as and extra protection over the nozzles 31, 32 preventing splattering from slag or liquid phase metal, and can be conical in shape. According to the type of installation, the cavity can be formed in the refractory wall or a cavity in the injector cooling system. In fact the injector cooling and protection system is composed of a metal structure that houses the injector. The external wall of this structure is constructed so that slag splattering will adhere to the surface, and therefore it takes advantage of this material as a natural refractory protection for the injector. The cavity is then built maintaining the surface of the ejectors in a retracted position compared to the cooling limit.

With fuel pulse values sufficiently high, and at the furnace working temperatures, the injector generates a lobed, stable flame that starts from the external limit or just before the cavity.

By using conical or flared geometry, the local circulation of the hot gases is increased to a temperature higher than that of self ignition of the furnace mixture, stimulating spontaneous re-ignition of the flame in cases where it is extinguished, and preventing direct flame contact with the external surfaces of the cavity with an obvious improvement for the work life of the furnace.

With this type of throat geometry the fuel and comburant mixture can be controlled with great precision: at low pulse values tapering generates fuel gas expansion slowing their flow and permitting better mixing action. Therefore combustion occurs on wide angles and in zones close to the injector. By increasing the pulse, the flame coherence is increased. Basically, the flame appears narrower and longer, the contribution made by the protection cavity 40 becomes, in proportion, increasingly less influential, although it continues to guarantee the beneficial effect of the presence of hot gases for ignition.

One solution used to maintain the benefits of a relatively high pulse, while still operating in widened flame conditions, consists of provoking a swirl rotation on the most external ring oxidising gases or on the fuels injected by the internal ring. This rotating movement is obtained by ducts 33 on a slope in relation to the burner axis in a spiral form that create a tangential moment in the gases in relation to the axis. The increased transversal diffusion creates a different thermal field especially in the area overlooking the burner with a beneficial effect on flame stability.

Figure 6:
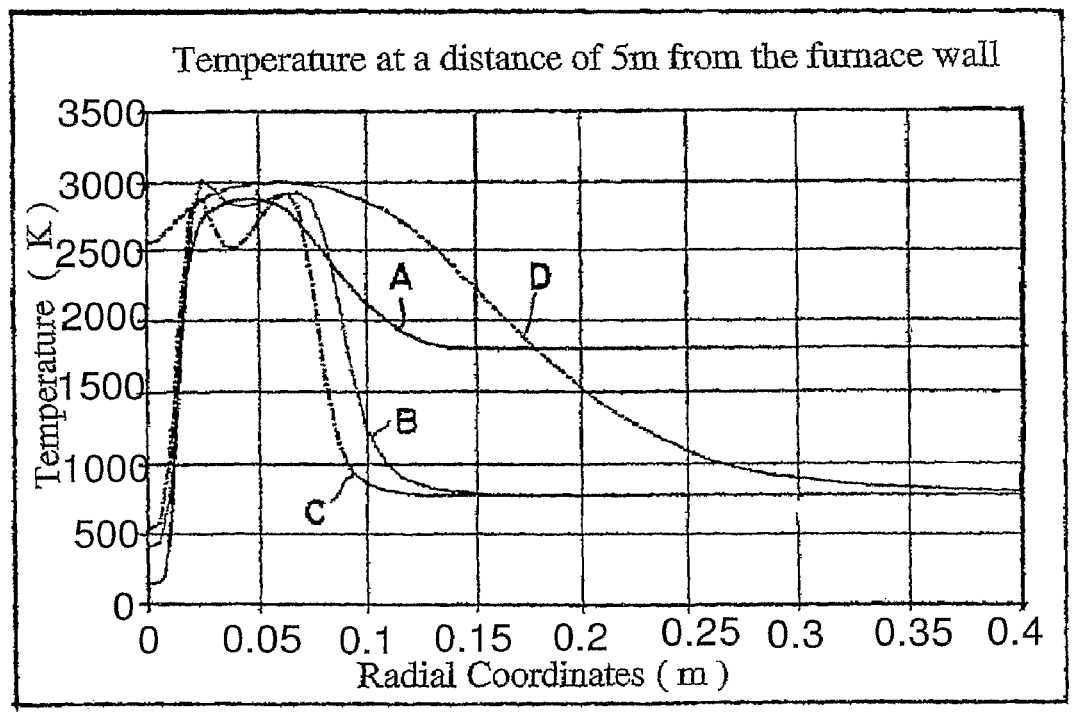

FIG. 6 shows a graph representing the temperature progress (K) according to the radial coordinate (m), in relation to four examples of combustion carried out by injector 10 with the double cone protection cavity schematically illustrated in FIG. 5a.

The overall section of the fuel nozzles 31 (methane) occupies 333 mm$^2$, while the overall section of the comburant nozzles 32 (oxygen) occupies 757 mm$^2$.

Therefore four curves, A-D were measured in different working conditions.

Curve A: 1250 Nm$^3$/hour at 12 bar, nozzle in EAF furnace environment at 1530° C.;

Curve B: 4 MWt natural gas, nozzle with output having a shockwave in air at 500° C.;

Curve C: 4 MWt natural gas, nozzle in air at 500° C.;

Curve D: 4 MWt natural gas, burner in air at 500° C.;

It should be considered that in the conditions of the oxygen injector described, coherence extends for approximately 1.5 meters.

Thanks to the geometry of the related injector, characterised in that it generates an added component of circumferential and tangential speed for the external comburant and fuel injection, the combustion process according to the present invention, in the following steps:

acts as a burner with a subsonic De Laval nozzle (20) with rapid combustion gas mixing, aimed at obtaining a wide flame able to heat the scrap agglomerates located in front of it rapidly and efficiently;

acts as a burner with a supersonic De Laval nozzle with a concentrated high pulse flame aimed at cutting the scrap and thus breaking up the conglomerate formations in front of the multifunction injector;

acts as an oxygen injector at supersonic speed with supersonic area extended as far as 70 times the outlet diameter of the De Laval nozzle, using a shrouding method to confine the flare laterally, and in this condition being able to send an oxygen injection directly into the liquid metal bath.

The combustion process for metallurgy treatment in an electric arc furnace according to the present invention optimises combustion, not only in extreme scrap melting conditions and supersonic oxygen injection into the liquid metal. In particular it adapts said combustion under intermediate conditions so that it improves the additional thermal capacity and the technical material according to the localised heated load to increase thermal homogeneity and/or injection into the metal to improve the chemical reaction.

In this manner the injector acts like a burner surrounding the scrap in front of it until the solid phase has been completely eliminated. In cases where agglomerates may be resistant to melting an increase in flame speed is foreseen until it attains a speed that is slightly supersonic but without provoking the complete coherent effect caused by shrouding. Under these conditions, the penetration power is increased while maintaining a flame angle that is sufficiently wide to optimise heat transfer to the load.

During refining, the fuel supply pressure is raised in the central De Laval nozzle 20, until it reaches a very high ejection speed of approximately 2 Mach. At the same time, the fuel and comburant ring injectors are activated to surround the central jet with a gas in combustion phase and to take best possible advantage of the shrouding effect.

The process described above is mainly foreseen for a multifunction injector able to carry out the different combustion steps according to the material present in the electric arc furnace.

From the aforesaid description with reference to the figures, it appears that a multifunction injector according to the invention is particularly useful and advantageous, this achieving the aims mentioned in the preamble to the description.

Naturally the embodiments of the device according to the invention, as well as its forms and the materials employed may differ from those described, provided simply as an example in the drawings, and to be considered by no means limiting.

The scope of protection of the invention is therefore defined by the appended claims.

The invention claimed is:

1. Multifunction injector (10, 11, 12) having a central axis, said injector comprising a De Laval nozzle (20) adapted to act as a burner at subsonic or supersonic speed, combined with a plurality of fuel nozzles (31) and an external ringa of comburant nozzles (32) respectively, arranged in two rings, concentric and coaxial to said De Laval nozzle (20) and externally protected by a specifically shaped protection cavity (40) wherein the external ring of comburant nozzles (32) has ducts (33) provided on a slope in relation to the central axis wherein said ducts (33) are arranged in a spiral form to cause a swirl rotation of oxidizing gases or fuels and the specifically shaped protection cavity (40) is conically shaped.

2. Multifunction injector (10, 11, 12) according to claim 1, characterised in that said De Laval nozzle (20) has a mouthpiece, said DeLaval nozzle (20) comprising the following in sequence starting from the mouthpiece:

a conical converging inlet section (21), having a length L1, inlet (25) with inlet diameter Din and half-angle of incidence ($\beta$);

a cylindrical throat (22) having a length (L2) and a throat diameter (Dth);

a circumferential tapering between the conical inlet section (21) and the following central cylindrical throat (22), having a radius (R1);

a conical diverging section (23), having a length (L3), and half-angle of incidence (OC);

a circumferential tapering between the throat (22) and the conical diverging outlet section (23), having a radius (R2);

a final cylindrical oxygen emission section (24), having a length (L4) and an outlet diameter (Dexit), a circumferential tapering between the conical diverging section (23) and the final cylindrical oxygen emission section (24) having a radius (R3).

3. Multifunction injector (10, 11, 12) according to claim 2 characterised in that said De Laval nozzle (20) is constructed according to the following dimensional relations:

the half-angle ($\beta$) of the converging conical inlet section (21) is between 7° and 20°;

the half angle ($\alpha$) of the diverging conical outlet section (23) is between 2° and 7°;

the tapering radius (R1) between the conical inlet section (21) and the cylindrical throat (22) is between 1 and 10 times the diameter (Dth) of the throat;—the length (L2) of the cylindrical throat (22) is between 0.5 and 5 times the diameter of the throat itself (Dth); the tapering radius (R2) between the cylindrical throat (22) and the diverging conical outlet section (23) is between 1 and 15 times the diameter of the throat (Dth); the tapering radius (R3), between the diverging conical section (23) and the final cylindrical section (24) is between 20 and 80 times the diameter of the throat (Dth)/—the length of the final cylindrical section (24) is between 0 and 3 times the diameter of the throat (Dth).

4. Multifunction injector (10, 11, 12) according to claim 1, characterised in that said fuel injection nozzles (31) are positioned in a complete ring around the De Laval oxygen nozzle (20) and inside the comburant nozzle (32) ring.

5. Multifunction injector (10, 11, 12) according to claim 4, characterised in that said fuel injection nozzles (31) are of a number between 8 and 20, and that their section can be trapezoid, circular or any other geometrical form.

6. Multifunction injector (10, 11, 12) according to claim 1, characterised in that the number of said comburant emission nozzles (32) is preferably between 5 and 20, and that their individual section can be circular, semicircular, or trapezoid, or of any other geometrical form.

7. Multifunction injector (10, 11, 12) according to claim 1, characterised in that said specifically shaped protection cavity (40) presents a first section (43) and a second section (44) in sequence with a conical form preferably between 20° and 30°.

8. Multifunction injector (10, 11, 12) according to claim 1, characterised in that said specifically shaped protection cavity (40) presents a constant conical form (42) of preferably 20°.

9. Combustion process for metallurgical treatment in an electric arc furnace using the multifunction injector according to claim 1, characterised in that it generates an added circumferential and tangential speed component for external comburant and fuel injection, operating the following steps:

acting as a burner with a subsonic De Laval nozzle (20) with rapid combustion gas mixing, and aimed at obtaining a wide flame able to heat scrap agglomerates located in front of it apidly and efficiently;

acting as a burner with a supersonic De Laval nozzle with a concentrated high pulse flame aimed at cutting the scrap and thus breaking up conglomerate formations in front of the multifunction injector;

acting as an oxygen injector at supersonic speed with supersonic area extended as far as 70 times the outlet diameter of the De Laval nozzle, using a shrouding method to confine the flare laterally, and in this condition being able to send an oxygen injection directly into a liquid metal bath.

* * * * *

UNITED STATES PATENT AND TRADEMARK OFFICE
CERTIFICATE OF CORRECTION

| | |
|---|---|
| PATENT NO. | : 7,611,563 B2 |
| APPLICATION NO. | : 11/883662 |
| DATED | : August 2, 2007 |
| INVENTOR(S) | : Francesco Memoli et al. |

It is certified that error appears in the above-identified patent and that said Letters Patent is hereby corrected as shown below:

Title page, item (73) should read as follows:

(73) Assignee: Techint Compagnia Tecnica Internazionale S.p.A.

Signed and Sealed this

Sixteenth Day of March, 2010

David J. Kappos
*Director of the United States Patent and Trademark Office*